US011494170B2

(12) United States Patent
Beale et al.

(10) Patent No.: US 11,494,170 B2
(45) Date of Patent: *Nov. 8, 2022

(54) PROXY COMPILATION FOR EXECUTION IN A FOREIGN ARCHITECTURE CONTROLLED BY EXECUTION WITHIN A NATIVE ARCHITECTURE

(71) Applicant: Unisys Corporation, Blue Bell, PA (US)

(72) Inventors: Andrew Ward Beale, Irvine, CA (US); Anthony P. Matyok, West Chester, PA (US); Clark C. Kogen, West Chester, PA (US); David Strong, Los Angeles, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,600

(22) Filed: Oct. 16, 2020

(65) Prior Publication Data

US 2022/0121432 A1 Apr. 21, 2022

(51) Int. Cl.
*G06F 8/41* (2018.01)
(52) U.S. Cl.
CPC .............. *G06F 8/47* (2013.01); *G06F 8/447* (2013.01)
(58) Field of Classification Search
CPC .................................. G06F 8/47; G06F 8/447
See application file for complete search history.

(56) References Cited

U.S. PATENT DOCUMENTS

| 5,768,593 | A | * | 6/1998 | Walters | G06F 9/45516 703/26 |
| 5,802,373 | A | * | 9/1998 | Yates | G06F 9/45504 717/139 |
| 5,930,509 | A | * | 7/1999 | Yates | G06F 9/4552 717/159 |
| 2004/0015972 | A1 | * | 1/2004 | Barclay | G06F 9/45516 718/102 |
| 2007/0079296 | A1 | * | 4/2007 | Li | G06F 9/45516 717/136 |
| 2012/0143589 | A1 | * | 6/2012 | Beale | G06F 8/47 703/26 |
| 2013/0326489 | A1 | * | 12/2013 | Eijndhoven | G06F 9/45508 717/139 |
| 2014/0130026 | A1 | * | 5/2014 | Yohn | G06F 9/4552 717/151 |

(Continued)

OTHER PUBLICATIONS

Li et al., "Proxy Compilation, Even Better Than Ever?" (Year: 2006).*

*Primary Examiner* — Phillip H Nguyen
(74) *Attorney, Agent, or Firm* — Merchant & Gould P.C.

(57) ABSTRACT

A proxy compiler may be used within a native execution environment to enable execution of non-native instructions from a non-native execution environment as if being performed within the native execution environment. In particular, the proxy compiler coordinates creation of a native executable that is uniquely tied to a particular non-native image at the time of creation of the non-native image. This allows a trusted relationship between the native executable and the non-native image, while avoiding a requirement of compilation/translation of the non-native instructions for execution directly within the native execution environment.

21 Claims, 8 Drawing Sheets

(56) References Cited

U.S. PATENT DOCUMENTS

2015/0186167 A1* 7/2015 Jennings ............. G06F 9/45504
717/148
2019/0370038 A1* 12/2019 Villmow ............. G06F 9/30174

* cited by examiner

PROXY COMPILATION FOR EXECUTION IN A FOREIGN ARCHITECTURE CONTROLLED BY EXECUTION WITHIN A NATIVE ARCHITECTURE

BACKGROUND

Traditionally, compilers take a specific source file as input and emit an object file for a specific target architecture. The object file may be subject to an additional linking phase to create an executable. When the executable is initiated, the executable performs operations described in the source code via execution of instructions for that target architecture.

Most commonly, the source code, the compiler, and the executable all reside on the same target architecture. For example, code written in the C/C++ programming languages may be compiled on an Intel x64 platform and executed in that same environment. Similarly, code written in COBOL and compiled in a COBOL compiler for a Unisys MCP processor architecture will typically be executed within such an MCP-based environment.

In some instances, a compiler may perform cross-compilation. This is where a target of the application differs from the target of the compiler itself. For example, a compiler running within the MCP environment may emit a codefile that is executable in an ARM processing environment. In a further example, certain ARM-based Linux distributions may be cross-compiled onto Intel x86/x64 platforms for execution.

In the direct compilation context, a compiler writer is required to have knowledge of the architecture of the platform to which the compiler is targeted. Furthermore, in the cross-compilation context, it is required to have compilers that are written for the initial target platform on which the source code is provided, but which have knowledge of a target architecture. Accordingly, in this case, a compiler writer is required to have knowledge of both architectures.

Where a particular architecture is not well known, it is possible that new programming languages may not be well-supported, either in direct or cross-compilation contexts, by compilers. For example, a native architecture may be a legacy architecture known by relatively few developers, and a foreign architecture may be a well-known architecture that supports use of many programming languages due to the proliferation of available compilers directed to that foreign architecture. However, new applications may be needed for use with such legacy systems. For example, many banking applications or other secure applications reside on such legacy architectures due to security/reliability concerns of using commodity systems. In these cases, although new programs are required, it is not desirable to write a new compiler for each new programming language such that the programming language can be used on or compiled from/to the native (e.g., legacy) architecture. Concurrently, there is a desire for flexible use of modern programming languages without concurrent maintenance of compilers for each language on otherwise unsupported architectures.

In view of the above limitations in flexible use of various languages across different host platforms that may not otherwise support such languages, improvements are desirable.

SUMMARY

In general, the present application relates to use of a proxy compiler within a native execution environment to enable execution of non-native instructions from a non-native execution environment as if being performed within the native execution environment. In particular, the proxy compiler coordinates creation of a native executable that is uniquely tied to a particular non-native image at the creation time of the non-native image. The proxy compiler can provide non-native instructions to a non-native image creator for creation of the image, and can receive identification information of that image (which is generated at the creation time of the non-native image) for inclusion in the native executable. This allows a trusted relationship between the native executable and the non-native image, while avoiding a requirement of compilation/translation of the non-native instructions for execution directly within the native execution environment.

In a first aspect, a method includes invoking a proxy compiler within a native execution environment by providing non-native instructions thereto. The method further includes, at the proxy compiler: determining a native source file to be used based on an identity of a non-native image creator to be used for creation of a non-native image; providing the non-native instructions to a non-native image creator in a non-native execution environment for creation of the non-native image; and based on obtaining identification information of the created non-native image, creating a new native source file from the native source file and the identification information. The method further includes, at a native compiler, compiling the new native source file into a native executable.

In a second aspect, a computing system includes a native execution environment on a host system having a native compiler and a proxy compiler stored thereon. The host system includes a processor and a memory, the memory storing instructions which, when executed, cause the host system to: invoke the proxy compiler within the native execution environment by providing non-native instructions thereto; and, at the proxy compiler: determine a native source file to be used based on an identity of a non-native image creator to be used for creation of a non-native image; provide the non-native instructions to a non-native image creator in a non-native execution environment for creation of the non-native image; and based on obtaining identification information of the created non-native image, create a new native source file from the native source file and the identification information. The instructions further cause the host system to, at the native compiler, compiling the new native source file into a native executable.

In a third aspect, a computer-implemented method includes invoking a proxy compiler within a native execution environment by providing non-native instructions thereto. The method also includes, at the proxy compiler: determining a native source file to be used based on an identity of a non-native image creator to be used for creation of a non-native image; providing the non-native instructions to a non-native image creator in a non-native execution environment for creation of the non-native image; and based on obtaining identification information of the created non-native image, creating a new native source file from the native source file and the identification information. The method also includes, within the native execution environment: at a native compiler, compiling the new native source file into a native executable; querying the read-only attribute to determine an identity of the non-native image; and issuing a command to instantiate a container operable to execute the non-native image within a non-native execution environment. The method also includes, within the instantiated container, executing the non-native image.

In a further aspect, a method includes invoking a proxy compiler within a native execution environment by providing non-native instructions thereto, and at the proxy compiler: determining a native executable to be used based on an identity of a non-native image creator to be used for creation of a non-native image; providing the non-native instructions to a non-native image creator in a non-native execution environment for creation of the non-native image; and based on obtaining identification information of the created non-native image, creating an instance of the native executable that is associated with the non-native image by assigning a read-only attribute to the instance of the native executable.

In a still further aspect, a computing system includes a native execution environment on a host system hosting a native executable having a read-only attribute assigned thereto by a proxy compiler at a creation time and a containerized non-native execution environment hosting a non-native image, the non-native image being created in response to non-native instructions sent to a non-native image creator by the proxy compiler. The read-only attribute corresponds to identification information of the created non-native image, and the identification information is generated by the non-native image creator and provided to the proxy compiler at the time of creation of the non-native image.

In yet a further aspect, a computer-implemented method includes invoking a proxy compiler within a native execution environment by providing non-native instructions thereto. The method further includes, at the proxy compiler: determining a native executable to be used based on an identity of a non-native image creator to be used for creation of a non-native image; providing the non-native instructions to a non-native image creator in a non-native execution environment for creation of the non-native image; and based on obtaining identification information of the created non-native image, creating an instance of the native executable that is associated with the non-native image by assigning a read-only attribute to the instance of the native executable. The method also includes, within the native execution environment: querying the read-only attribute to determine an identity of the non-native image; and issuing a command to instantiate a container operable to execute the non-native image within a non-native execution environment. The method still further includes, within the instantiated container, executing the non-native image.

DETAILED DESCRIPTION

As briefly described above, embodiments of the present invention are directed to use of a proxy compiler within a native execution environment to enable execution of non-native instructions from a non-native execution environment as if being performed within the native execution environment. In particular, the proxy compiler coordinates creation of a native executable that is uniquely tied to a particular non-native image at the time of creation of the non-native image. The proxy compiler can provide non-native instructions to a non-native image creator for creation of the image, and can receive identification information of that image (which is generated at the time of creation of the non-native image) for inclusion in the native executable. This allows a trusted relationship between the native executable and the non-native image, while avoiding a requirement of compilation/translation of the non-native instructions for execution directly within the native execution environment.

The methods and systems described improve the flexibility by which code written in an unsupported programming language for a particular target architecture may be compiled and executed in a foreign architecture, but useable as if executing in the particular target architecture. This allows flexible use of any programming language in a foreign architecture as if natively provided in the target architecture without requiring creation of a new compiler for that target architecture, thereby drastically reducing the development time of new applications that may be written in any language and flexibly deployed across different computing system architectures.

Figure 1:
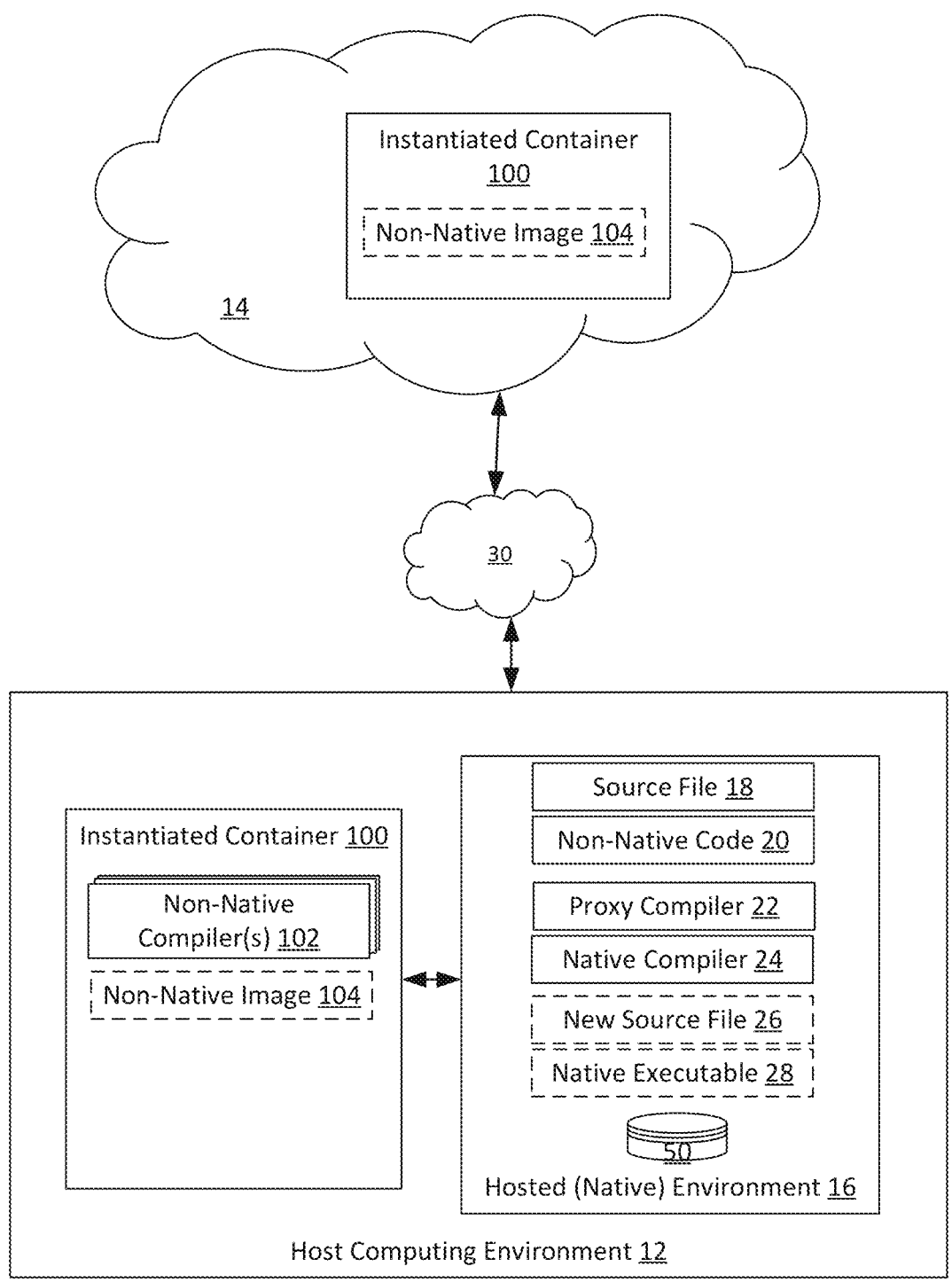
FIG. 1 illustrates an example environment in which aspects of the present disclosure may be implemented.

Referring to FIG. 1, an example environment 10 in which aspects of the present disclosure may be implemented is shown. In the example shown, a computing environment 10 includes a host system 12 as well as external computing resources 14, such as cloud resources. The host system 12 can, for example, be a commodity computing system including one or more computing devices, such as the computing system described in conjunction with FIGS. 2-4. The host system 12 may, for example, execute utilizing a particular instruction set architecture and operate in system, such as an x86/x64 or ARM-based instruction set architecture and a Windows-based operating system provided by Microsoft corporation of Redmond Wash.

In the example shown, the host system 12 may host one or more hosted computing environments 16. The hosted computing environments 16 may include, for example, a hosted environment that executes utilizing a different instruction set architecture as compared to the host system. For example, in some embodiments, the hosted computing environment 16 may include a MCP-based computing environment provided by Unisys Corporation of Blue Bell, Pa. However, other instruction set architectures, or operating systems may be utilized as well.

In the context of the present disclosure, the hosted computing environment 16 may be considered a native execution environment for software targeting data stored within that environment, while the host computing environment may correspond to a non-native computing environment. Other arrangements are possible as well, for example use of a non-native computing environment of another computing system that is remote from the host system 12 (e.g., within the external computing resources 14).

In the example shown, the hosted environment 16 is an environment in which workloads are desired to be executed. An example workload may be written using non-native code. That non-native code would typically be compiled into a native executable by cross-compilation of that code. However, as noted above, this would require a compiler writer to have knowledge of the architecture of the hosted environment 16. To avoid this requirement, in the example shown, the hosted environment 16 includes a source file 18, non-native code 20, a proxy compiler 22, and a native compiler 24.

The source file 18 represents an example set of code that defines a program useable to instantiate a container within a non-native execution environment, such as native executions on the host system 12 or within external computing resources 14. The source file 18 therefore may therefore represent a template including instructions to instantiate a containerized non-native execution environment within which a non-native image may be executed, and may further include instructions for establishing a communication connection between the native execution environment (e.g., the hosted environment 16) and the containerized non-native execution environment, to allow that non-native image to interact with programs and data within the native execution environment. In example embodiments, two or more source files may be provided that allow for communicative connections to different types or locations of containerized non-native execution environments.

In example embodiments, the source file 18 may be implemented as source code that may be compiled for a native environment. In still further embodiments, the source file 18 may represent an executable codefile that may be executed natively within the native execution environment, and has one or more extensible or definable attributes that may be used to link that codefile to a non-native image.

The non-native code 20 may represent source code or object code written for execution within the non-native environment. For example, the non-native code 20 may represent code written in a language for which no compiler exists targeting the native execution environment. In example embodiments, the non-native code 20 maybe written in, e.g., C++, Perl, Python, or some other language for which a compiler is readily available in a non-native execution environment but no convenient compiler is available for use in the native execution environment.

The proxy compiler 22 is described in further detail below, but generally manages a process by which the non-native code 20 is inspected to determine what type of image creator (e.g., compiler) may be used to generate an image in a non-native environment, and to select and appropriate source file 18 (from among the one or more provided, as noted above). The proxy compiler 22 then generally manages providing the non-native code 20 and any further information required to generate an image from that non-native code in a non-native execution environment, obtains unique information regarding that generated image, and ties the image to a native executable, for example by modifying the source file 18. This ensures a one-to-one correspondence between the non-native code 20 and the source file 18.

In the example shown, a native compiler 24 may be provided within the hosted environment 16 as well. The native compiler 24 may be used in instances where the source file 18 comprises source code that requires compilation prior to execution within the hosted environment 16. In such instances (and as discussed below in conjunction with FIGS. 5-6), a source file may be modified to create a new source file (e.g., new source file 26) that uniquely identifies non-native image; once compiled into a native executable (e.g., native executable 28), that native executable may be bound to a non-native image that it calls and communicates with/controls from within the hosted environment 16.

As illustrated in FIG. 1, one or more instantiated containers 100 may be formed on the host computing environment 12 or external computing resources 14. In such an example, an execution container may be instantiated by executing software, such as software being executed within the hosted computing environment 16. Generally, such instantiated containers may be used to provide a secure boundary around an execution area that may be used for executing the non-native image. Although any of a variety of types of containerization software systems may be used, in some examples, the execution container may be a Docker container provided by Docker, Inc., which includes a set of operating system level virtualization services usable to containerize software packages for independent execution.

In the example shown, the instantiated containers 100 can provide a non-native execution environment. In example embodiments, the instantiated containers 100 may include one or more non-native image creators (e.g., compilers 102) and may enable execution of a non-native image 104. The non-native image 104 may be created, for example, by compiling source code in the non-native execution environment via an image creator such as a compiler 102 that is specific to the language used in the source code.

Various non-native images 104 may be generated and stored in a database (e.g., within database 50 in the hosted environment 16), such that specific images may be executed by calling a corresponding native executable which instantiates a new container 100 and stores a non-native image 104 therein. The uniquely-associated native executable 28 may then establish communication between the new container 100 and the hosted (native) environment 16 to allow interaction between such environments in a trusted manner.

As further discussed below, a process of managing execution within non-native execution environments (e.g., containers 100) is provided herein which is controlled from a native executable (e.g., executable 28 within a native environment 16) that is uniquely tied to that non-native image using techniques described herein. By using a proxy compiler to enable communication between native and non-native environments and ensuring that non-native images are trusted by native code (e.g., via the native executable 28), the non-native image may be used to interact with programs and data within the native execution environment.

Accordingly, FIGS. 2-4 below provide further details regarding a particular environment in which the general process may take place. FIGS. 5-8 then describe example methods for creation and management of such native and non-native executable code using a proxy compiler, thereby avoiding a requirement to create a new native compiler for each type of source code language that may be desired.

I. Example Hardware Environment

Figure 2:
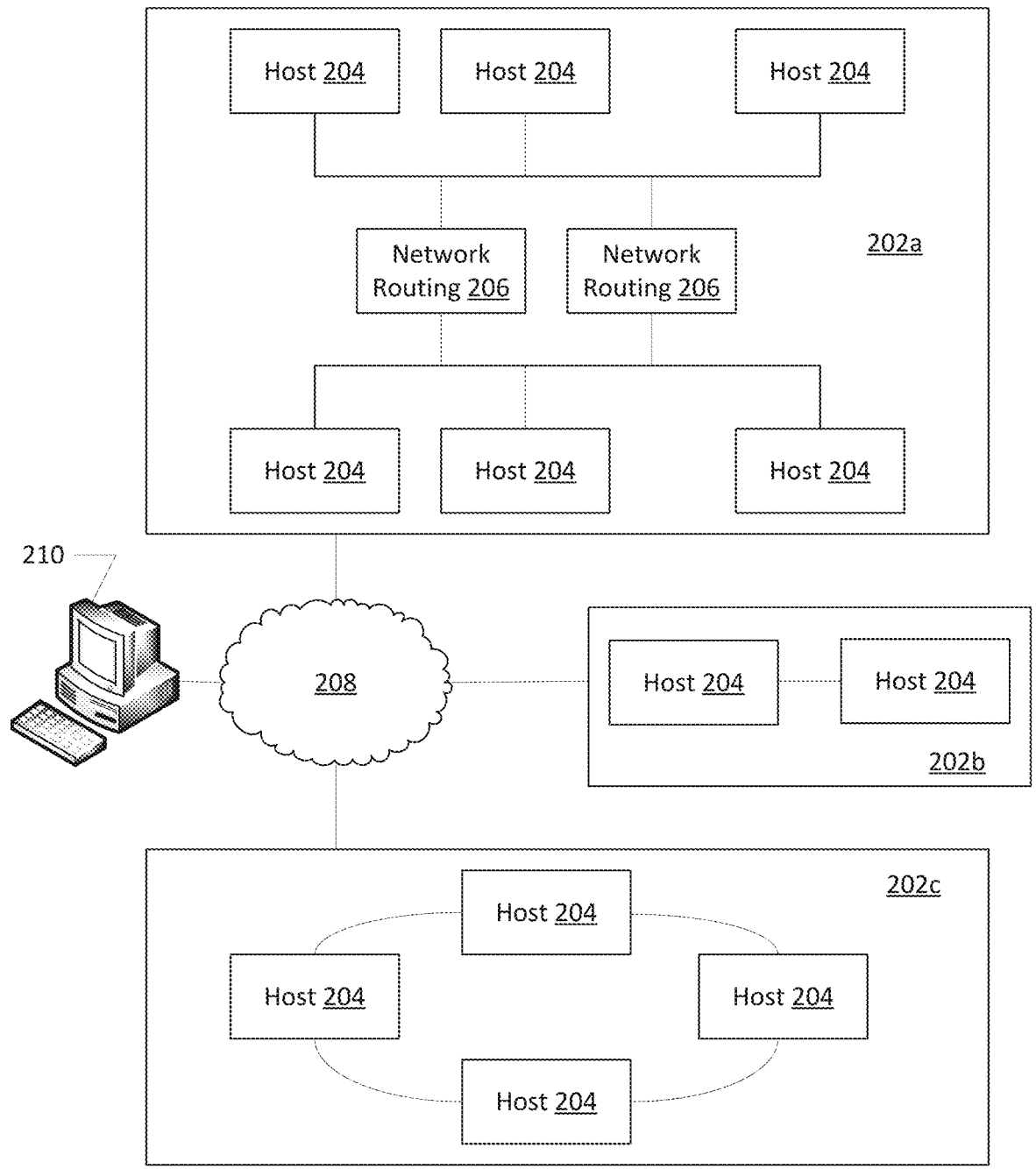
FIG. 2 illustrates a distributed multi-host system in which aspects of the present disclosure can be implemented.
Figure 3:
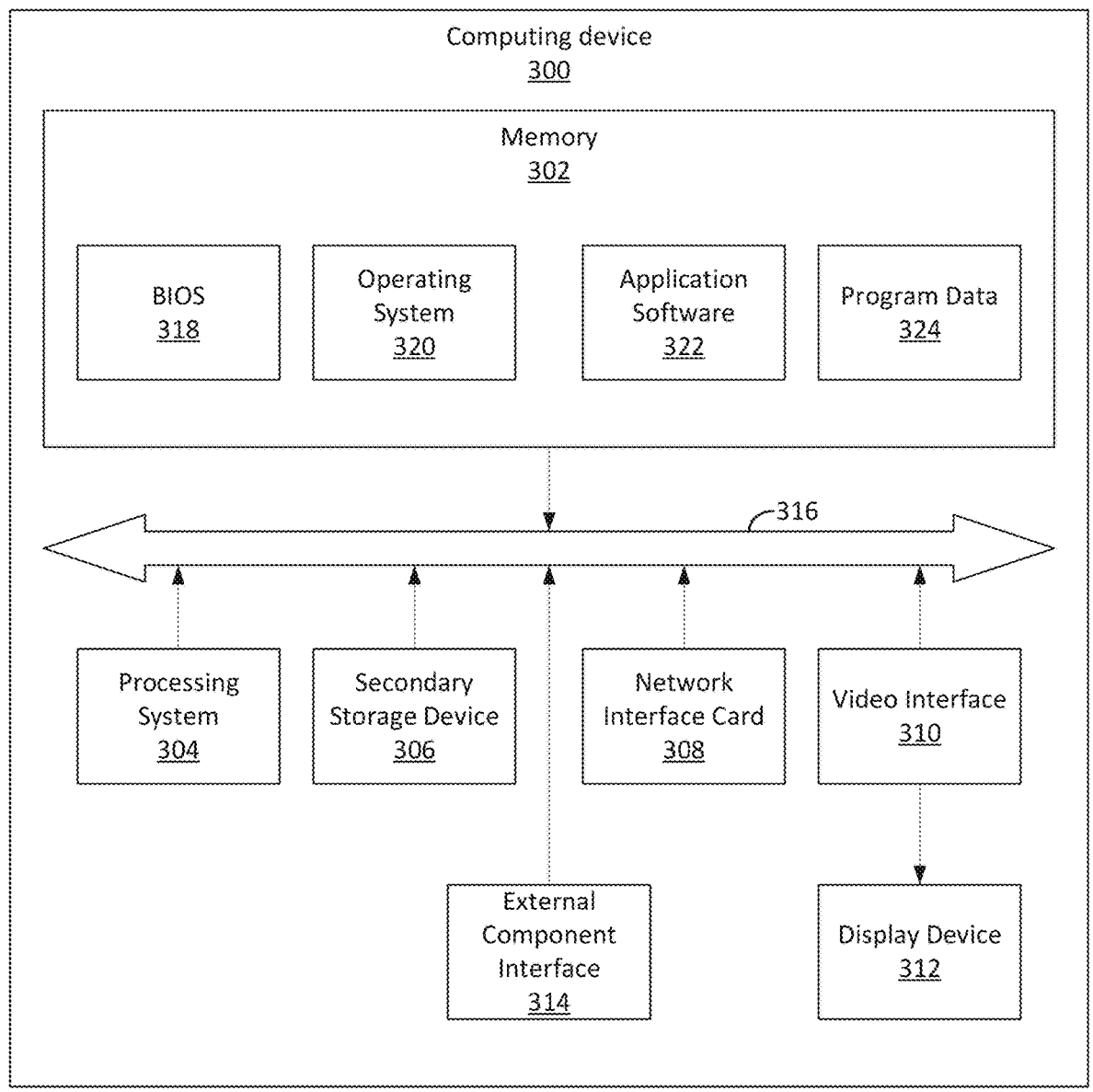
FIG. 3 is a schematic illustration of an example computing system in which aspects of the present disclosure can be implemented.
Figure 4:
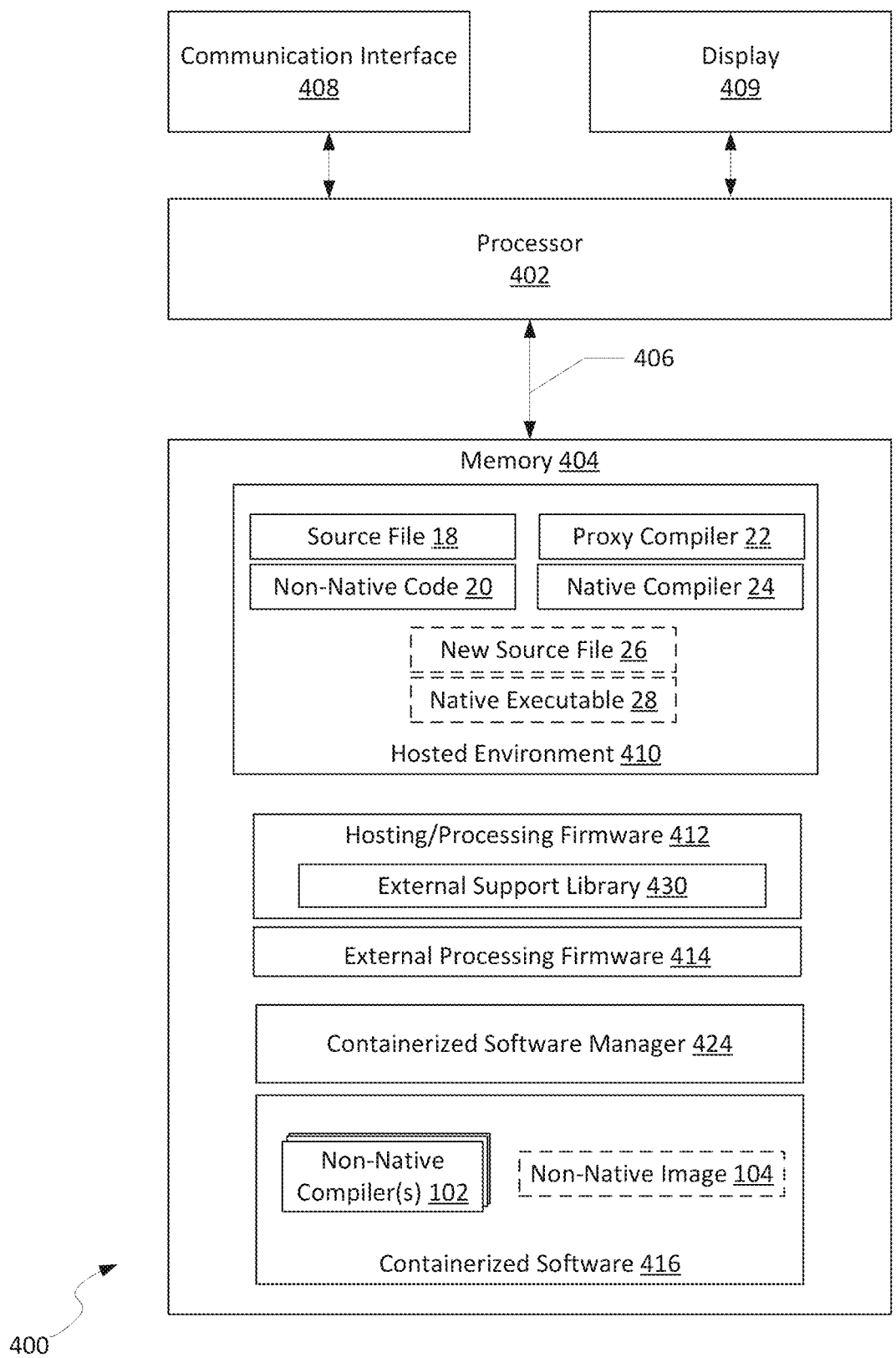
FIG. 4 is a schematic illustration of an example computing system useable as a host computing system for operation of native and/or non-native execution environments in the context of the present disclosure.

Referring now to FIGS. 2-4, example hardware environments are disclosed in which aspects of the present disclosure may be implemented. The hardware environments disclosed may, for example, represent particular computing systems or computing environments useable within the overall context of the system described above in conjunction with FIG. 1.

Referring now to FIG. 2, a distributed multi-host system 200 is shown in which aspects of the present disclosure can be implemented. The system 200 represents a possible arrangement of computing systems or virtual computing systems useable to implement the environment 10 of FIG. 1. In the embodiment shown, the system 200 is distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202a includes network routing equipment 206, which routes communication traffic among the various hosts 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an IP-based network; in alternative embodiments, other types of interconnect technologies, such as an Infiniband switched fabric communications link, Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host systems 204 at locations 202a-c can be accessed by a client computing system 210. The client computing system can be any of a variety of desktop or mobile computing systems, such as a desktop, laptop, tablet, smartphone, or other type of user computing system. In alternative embodiments, the client computing system 210 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 204 may have different numbers or types of processing cores, and different capacity and type of memory and/or caching subsystems could be implemented in different ones of the host system 204. Furthermore, one or more different types of communicative interconnect technologies might be used in the different locations 202a-c, or within a particular location.

Referring now to FIG. 3, a schematic illustration of an example discrete computing system in which aspects of the present disclosure can be implemented. The computing device 300 can represent, for example, a native computing system operable as a host computing environment 12, or various cloud resources 14. In particular, the computing device 300 represents the physical construct of an example computing system at which an endpoint or server could be established. In some embodiments, the computing device 300 implements virtualized or hosted systems.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 (and/or a Unified Extensible Firmware Interface (UEFI), not shown) and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal.

By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

FIG. 4 is a schematic detailed illustration of an example computing system useable within a computing environment, such as the host computing platform 12 described above in connection with FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3.

The memory 404 can include any of a variety of memory devices, such as using various types of computer-readable or computer storage media, as also discussed above. In the embodiment shown, the memory 404 stores instructions which, when executed, provide a hosted environment 410, hosting firmware 412, external processing firmware 414, and optionally containerized software 416, discussed in further detail below. The computing system 400 can also include a communication interface 408 configured to receive and transmit data, e.g., to provide access to a sharable resource such as a resource hosted by the hosted environment 410. Additionally, a display 409 can be used for viewing a local version of a user interface, e.g., to view executing tasks on the computing system 400 and/or within the hosted environment 410.

In example embodiments, the hosted environment 410 is executable from memory 404 via a processor 402 based on execution of hosting firmware 412. Generally, the hosting firmware 412 translates instructions stored in the hosted environment 410 for execution from an instruction set architecture of the hosted environment 410 to an instruction set architecture of the host computing environment, i.e., the instruction set architecture of the processor 402. In a particular embodiment, the hosting firmware 412 translates instructions from a hosted MCP environment to a host Windows-based (e.g., x86-based) environment. In other particular embodiments, the hosting firmware translates instructions from a different hosted environment (e.g., an ARM-based or other architecture) to a host environment (e.g., Windows-based or otherwise).

In the example shown, the memory 404 includes external processing firmware 414 and optionally, containerized software 416. The external processing firmware 414 is accessible from and called by the hosting firmware 412 for purposes of allowing the hosted environment 410 to interact with external software, e.g., containerized software 416 or other software executing from remote computing systems. In example embodiments, the hosting firmware 412 and external processing firmware 414 are directly executable via the processor 402, for example on separate, dedicated threads of the computing system.

In example embodiments, the hosted environment 410 includes various programs and data, including the source file 18, non-native code 20, proxy compiler 22, and optionally the native compiler 24 described above. In some further embodiments, one or more of a new/revised source file 26 and a native executable 28 may be stored within the hosted environment 410 as well, as also described above in conjunction with FIG. 1.

In the example shown, the containerized software manager 424 is included at the host computing platform 12. In general, the containerized software manager 424 allows for creation and configuration of containerized software systems that may in turn connect to the hosted environment 410. The containerized software manager 424 may, for example, correspond to a Docker manager tool that may be callable from applications within the hosted environment 410 (e.g., the native executable 28) by communication via the external processing firmware 414. In such an arrangement, the containerized software manager 424 may be called from within the hosted environment 410 to instantiate containerized software 416, either local to or remotely from the host platform 12 of FIG. 1.

In the example shown, the hosting firmware 412 includes an external support library 430. The external support library 430 can include, for example, various processes that are used by the hosting firmware 412 to interact with the external processing firmware 414. For example, in the context provided herein, the external support library 430 may include functions used for generating access credentials to sharable resources within the hosted environment 410, or for otherwise facilitating communication between the hosted environment 410 and containerized software 416.

Although the system 400 reflects a particular configuration of computing resources, it is recognized that the present disclosure is not so limited. In particular, use of a proxy compiler and a native executable to manage execution of non-native software in a non-native environment may be performed in a variety of contexts beyond the hosted arrangement described herein; rather, the native execution environment may be native to the host system itself, and the non-native execution environment may be an entirely different (virtualized or non-virtualized) environment either local to or remote from the host system.

II. Proxy Compiler Operation; Example Embodiments

Figure 5:
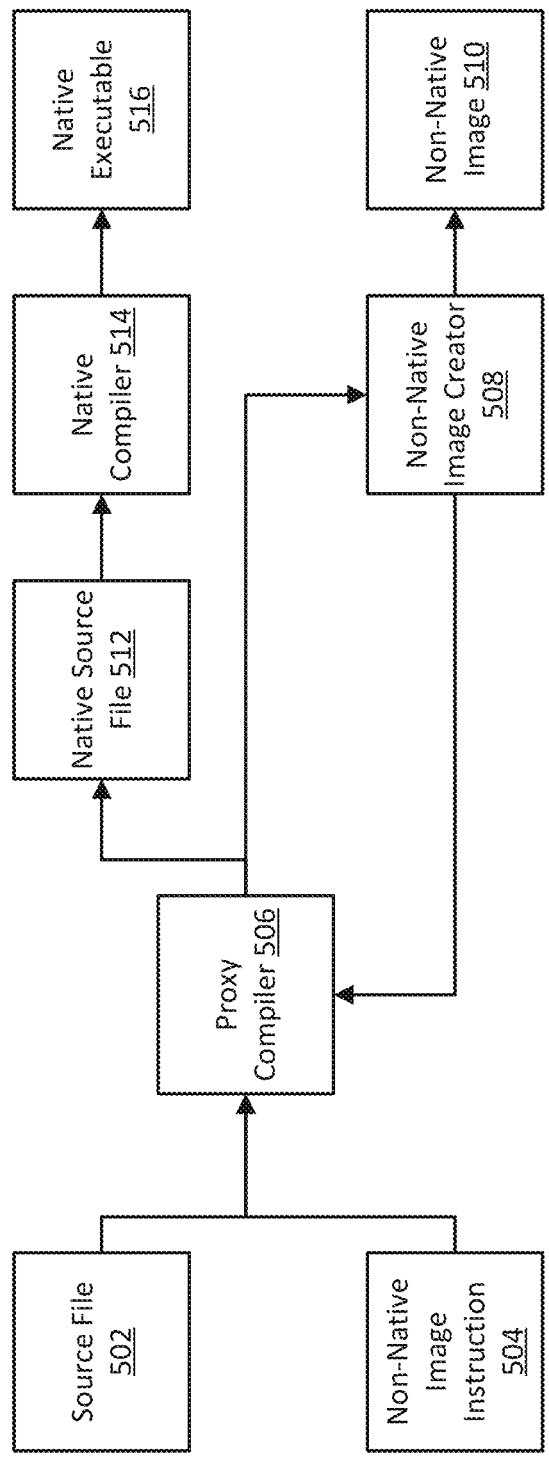
FIG. 5 illustrates a logical process flow for using proxy compilation to manage execution in a non-native execution environment that is controlled from within the native execution environment, according to a first example embodiment.
Figure 6:
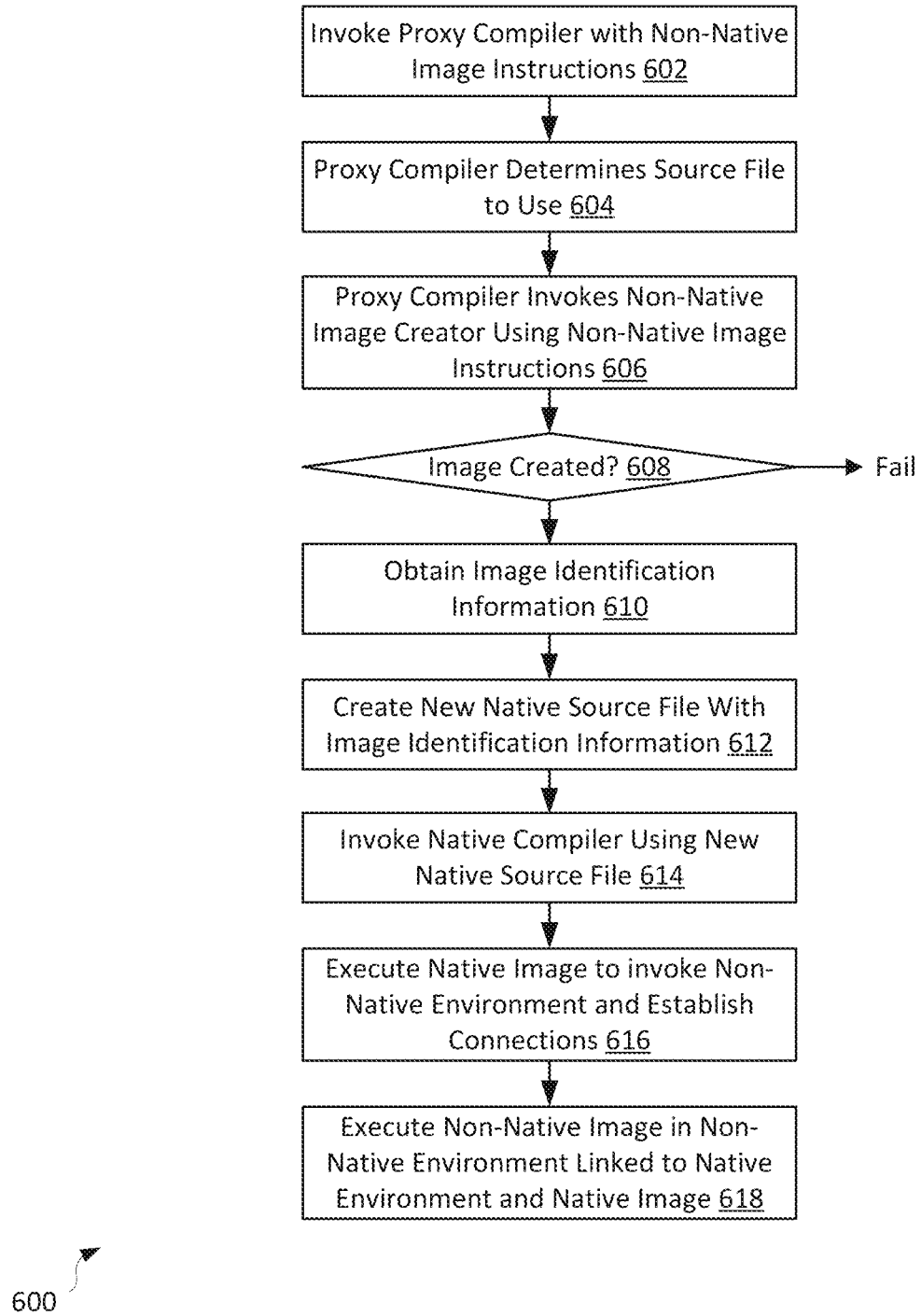
FIG. 6 illustrates a flowchart of a method of creating a non-native image and a native executable for controlling execution of the non-native image, according to the example process flow of FIG. 5.
Figure 7:
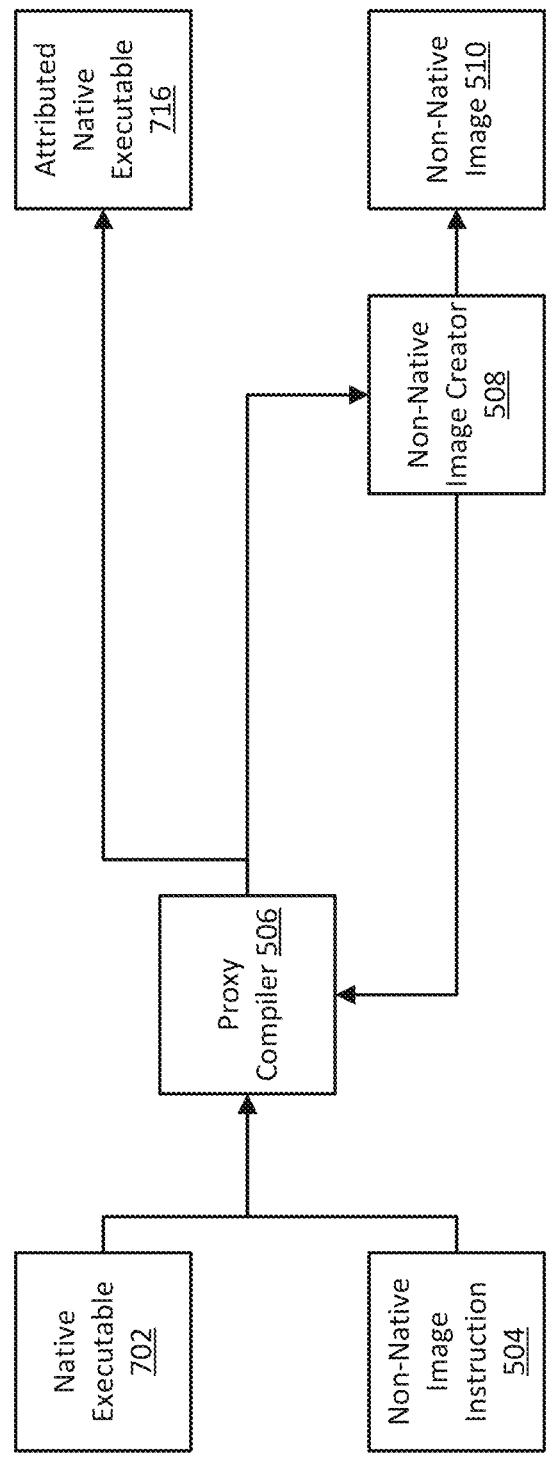
FIG. 7 illustrates a logical process flow for using proxy compilation to manage execution in a non-native execution environment that is controlled from within the native execution environment, according to a second example embodiment.
Figure 8:
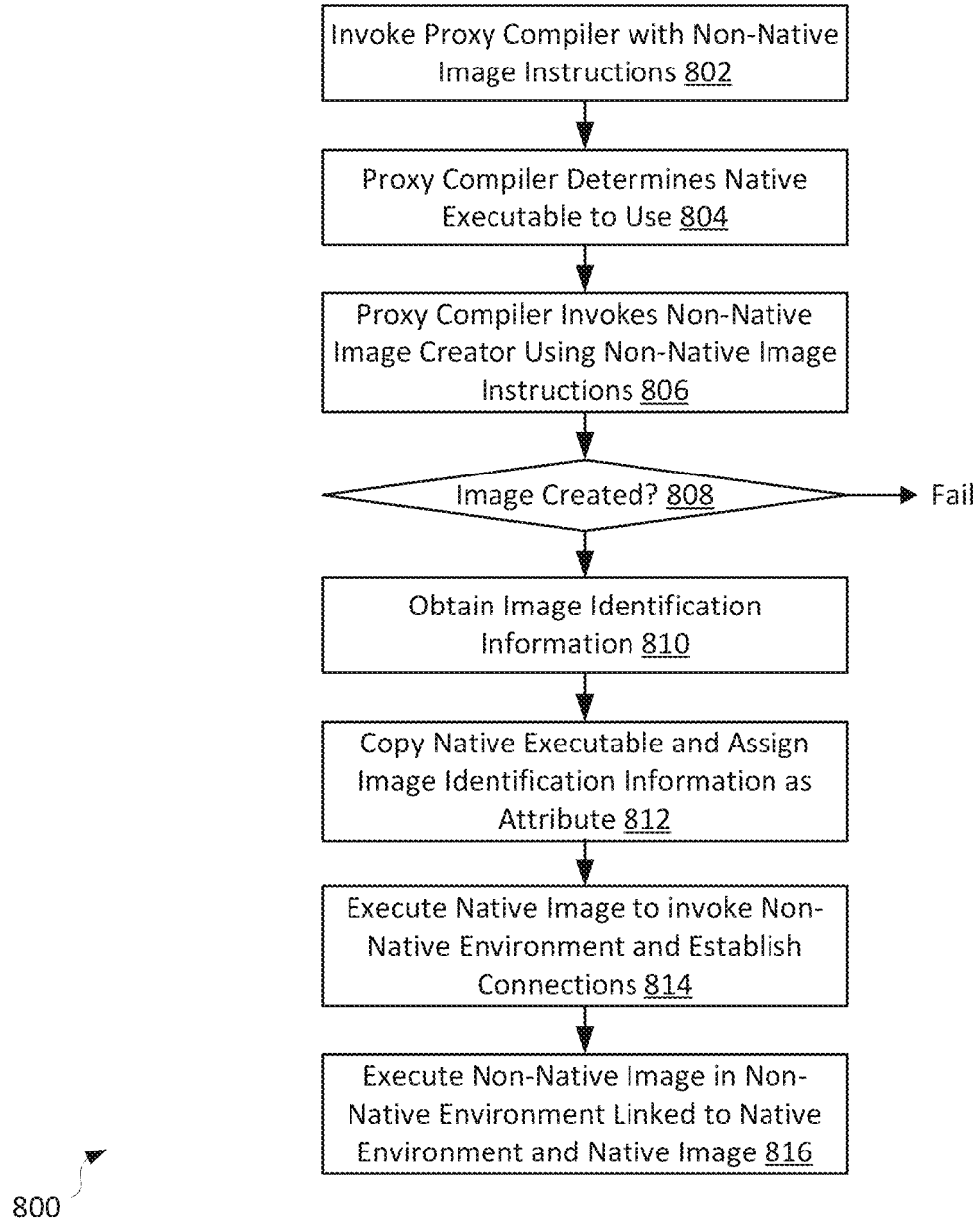
FIG. 8 illustrates a flowchart of a method of creating a non-native image and a native executable for controlling execution of the non-native image, according to the example process flow of FIG. 7.

Referring now to FIGS. 5-8, example embodiments of the present disclosure are provided which illustrate possible approaches to use of a proxy compiler to create a native executable tied to a particular non-native image to allow for execution of that non-native image in a non-native execution environment in a manner that is controlled from within a native execution environment where the native executable resides. Once a non-native image is created, a proxy compiler can do what is necessary to emit the executable with the 1-to-1 relationship established in an immutable fashion. Multiple techniques for this are described herein. For example, FIGS. 5-6 illustrate a first example embodiment that is useable across a variety of types of execution environments, and FIGS. 7-8 illustrate a second example embodiment in which additional efficiencies are gained by avoiding some compilation processes, but which requires use of extensible metadata (e.g., such as file attributes) to store a relationship between a native executable and a non-native image.

Referring first to FIG. 5, a logical process flow 500 is shown for using proxy compilation to manage execution in a non-native execution environment that is controlled from within the native execution environment, according to a first example embodiment. In the example shown, a proxy compiler 506 (e.g., analogous to the proxy compiler 22 of FIGS. 1 and 4, above) has access to one or more source files 502 and one or more sets of non-native instructions 504. In this example, the proxy compiler 506 takes source code as input. The non-native instructions 504 may be, for example, build instructions useable to form a non-native image that may be executed within a non-native environment.

Generally, the proxy compiler 506 can assess the non-native instructions 504 to determine an appropriate source file 502 for use. The source file 502 is different from typical source files. This source file 502 consists of a specialized source program, written in arbitrary language, for which a compiler in the native environment already exists. This specialized source file 502 can be used as a template, as it has indicators within it which mark the areas which must be modified by the proxy compiler 506 in order to produce an executable capable of invoking and communicating with a single non-native container (e.g., a container 100 as discussed above).

In the example shown, the proxy compiler 506 provides the non-native instructions 504 to a non-native image creator 508 (e.g., a compiler in a non-native execution environment, such as compiler 102 described above). The non-native image creator 508 will create a non-native image 510 from the non-native instructions 504. The non-native image creator 508 can then return identifier information of the non-native image 510 to the proxy compiler 506.

The proxy compiler 506 may then use a selected, appropriate source file 502 and create a new native source file 512 using the identifier information of the non-native image 510. For example, the new native source file 512 may have embedded within it the identifier information, thereby linking any compiled executable based on the new native source file 512 uniquely to the non-native image 510. In particular, a native compiler 514 may create a native executable 516 which, when executed, instantiates a container within which the non-native image 510 may be executed, and manages execution of the non-native image 510 in communication between a non-native execution environment and the native execution environment in which the native executable 516 resides.

As can be seen in this general description (and the specific methodology described in conjunction with FIG. 6, below) the proxy compiler 506 is not emitting an object code or an executable directly, but instead emits a source file which can then be compiled by a different compiler 514 which already exists in the native environment.

This approach brings great flexibility and greatly reduces development time for alternate non-native image creators.

Instead of having to create a new compiler for use in the native execution environment, which is a labor-intensive task, the existing proxy compiler is simply modified to invoke the non-native image creator 508 and acquire image identification information for a successful image creation. This is much faster in terms of development time than creating a new compiler from scratch which understands a non-native image instruction.

Referring now to FIG. 6, a flowchart is shown depicting a more detailed method 600 of creating a non-native image and a native executable for controlling execution of the non-native image, according to the example process flow of FIG. 5.

In the embodiment shown, the proxy compiler 506 is invoked by the user, supplying non-native instructions 504, e.g., in a file (step 602). It is noted that in some embodiments, multiple non-native image creators may be supported. Accordingly, the proxy compiler 506 determines an identity of a proper non-native image creator image instructions 504.

Also in the embodiment shown, the proxy compiler 506 determines the appropriate source file 502 to be used (step 604). The appropriate source file 502 is determined based, for example, on an identity of the non-native image creator that was determined in step 602.

The proxy compiler 506 invokes a command that is performed in a non-native execution environment that runs the selected non-native image creator 508 (step 606). The proxy compiler 506 provides to the non-native image creator 508 the non-native instructions 504, and additionally connects standard I/O connections (e.g., stdin, stdout, and stderr files) to the proxy compiler from the command which it invoked. This allows the proxy compiler and the user in the native environment to monitor the creation of the non-native image in real time.

It is noted that in some embodiments, additional information may be provided to the non-native image creator 508 beyond simply the non-native instructions 504. For example, in some instances a build directory is required to be provided. In such a case, the proxy compiler 506 makes the new build directory accessible to the non-native image creator 508, e.g., via a network mapping to a build directory from the non-native environment.

Continuing discussion of FIG. 6, the proxy compiler 506 waits for a determination of whether the non-native image 510 was successfully created (operation 608). If the image was not successfully created, no further operation is required, as the overall process will fail. However, is the image was successfully created, a confirmation may be received by the proxy compiler 506 from the non-native image creator 508.

Generally, the non-native image creator 508 will store a successfully created a non-native image in the repository, such as a database (e.g., database 50 described above in conjunction with FIG. 1). When a user runs this image, a separate container (e.g., container 100) may be created based on the image, and the container will have a unique ID as well.

In the example shown, if a non-native image was successfully generated, image identification information may be obtained by the proxy compiler 506 (step 610). For example, the proxy compiler may receive the identification information via stdout. In other instances, the identification information may be acquired by a mechanism compatible with the non-native image creator, e.g., emitted to a file which must be read by the proxy compiler. Whatever mechanism the non-native image creator employs, the proxy compiler is adaptable in a manner compatible with that implementation. In example embodiments, the identification information can be a unique code, such as a hexadecimal hash code generated by the image creator.

Once the identification information is obtained, the proxy compiler 506 creates a new native source file (step 612) based on the identification information and the selected source file 502. This specializes the new native source file such that when compiled, it will be capable of executing a container based only on the specific non-native image that is identified therein.

Accordingly, in this embodiment the proxy compiler 506 does not compile code but instead generates new source code which may subsequently be compiled natively. Specifically, the proxy compiler 506 invokes a native compiler 512, providing the new native source file (step 614). This generates a native executable 516 which instantiates a container 100 and calls the non-native image 510 (step 616). Additionally, connections between the native execution environment and the non-native execution environment are formed. The non-native image 510 may then be executed in the non-native environment, in a manner linked to the native executable 516, such that the native executable may control execution and terminate the container upon completion.

Referring to FIGS. 5-6 generally, it is noted that the native executable 516 that is compiled is, at the time of compilation, wholly integrated with the security model of the native execution environment. That is, the native executable has all the attributes and qualities of native executables. When the user wishes to execute the non-native image within a container, the native executable is run. This does the required processing to invoke the customized command in the non-native execution environment, again with stdin, stdout, and stderr redirected, so that the user in the native execution environment can interact seamlessly with the container running in the non-native execution environment.

Referring now to FIGS. 7-8, an alternative approach for using a proxy compiler to manage execution in a non-native execution environment that is controlled from within a native execution environment. As compared to the approach of FIGS. 5-6, this approach removes the requirement of compiling a native executable for native execution environments in which executable files have assignable attributes that may instead be used to uniquely associate the native executable with a non-native image.

Specifically, this embodiment leverages the concept of metadata (e.g., such as file attributes) to store the image identification. Files have many attributes and other metadata which may vary between environments. Attributes like file length are somewhat universal, but many are also very environment specific. This is particularly true for the Unisys MCP environment, in which an example implementation may be used. In that context, there are over 400 file attributes in the MCP environment. A new file attribute named IMAGEID may be created for the specific purpose of retaining a string for the identifier. Once this attribute has been set on a code file, the executing program can interrogate the attribute at run time and modify its behavior at runtime. An executing program cannot however, modify the IMAGEID attribute; only the proxy compiler has that privilege.

Of course, although use of an attribute of a file is described above for purposes of tying a native executable to a non-native image, other metadata associated with that native executable may be used as well; generally, any type of metadata that may be used to uniquely identify the non-native image, and which is modifiable only by the proxy compiler (or an affiliate/related program thereof) would be suitable for use.

Referring to the implementation in further detail, FIG. 7 illustrates a logical process flow 700 for this alternative embodiment. In this example, the proxy compiler 506 obtains non-native instructions 504 as discussed in conjunction with FIG. 5, and calls an appropriate non-native image creator 508 to create a non-native image 510 as discussed above. However, rather than accessing an appropriate source code file that corresponds to the non-native image creator 508, in this embodiment, a corresponding native executable file 702 may be accessed. A copy of that native executable 702 may be made by the proxy compiler 506, with the copy being assigned the IMAGEID attribute to be used. This forms an attributed native executable 716, which may be called to instantiate a container (e.g., container 100) for hosting the non-native image 510.

Referring specifically to the detailed flowchart of the method 800 seen in FIG. 8, the proxy compiler 506 is invoked by a user, who supplies it with the non-native instructions 504 (e.g., in a file) (step 802). The proxy compiler 506 selects a particular non-native image creator that is useable with the non-native instructions 504. If multiple non-native image creators are supported on the system, either an indication of which creator is to be used must be supplied, or the proxy compiler must be able to discern the proper creator based on the contents of the non-native instructions or alternate mechanism.

In the example shown, the proxy compiler 506 determines which specific native executable 702 to be used based on the identity of the non-native image creator discerned in step 802 (at step 804). Although a single native executable 702 is shown, different native executables may be used to connect to different types of environments as indicated by different non-native image creators. Each native executable is tailored for the specific non-native environment which it interacts with.

Continuing the example shown, the proxy compiler 506 invokes a command in the non-native execution environment (step 806) which runs the non-native image creator 508 and provides the non-native instructions 504 to it. The files stdin, stdout, and stderr are all connected to the proxy compiler from the command which it invoked. This allows the proxy compiler 506 and the user in the native execution environment to monitor the creation of the non-native image 510 in real time.

In some embodiments, more information may be required beyond the non-native instructions 504. For example, a build directory may be needed. In such instances, the proxy compiler 506 makes this entity accessible to the non-native image creator 508. This may be, for example, a network mapping to the build directory from the non-native execution environment.

At this stage, the proxy compiler 506 waits for the image creation process to complete and determine if the image was successfully created (at operation 808). If the image was not successfully created, no further operation is required, as the overall process will fail. However, if the image was successfully created, a confirmation may be received by the proxy compiler 506 from the non-native image creator 508. For example, the non-native image may be stored in an image repository. When a user runs this non-native image, a container (e.g., container 100) is created based on the non-native image 510, and the container will have a unique ID.

If the non-native image is successfully created, the image identification information is obtained by the proxy compiler 506 (step 810) via a mechanism compatible with the non-native image creator 508. As above, in some cases, the information is returned via stdout. In other cases, it is emitted to a file which must be read by the proxy compiler 506.

In the embodiment shown, the proxy compiler 506 will create a copy of the native executable 702, and provide that copy with a new name and attributes, forming an attributed native executable 716 (step 812). For example, the new copy may be otherwise renamed or defined in a way that is specific to the non-native executable. Since the image instructions represent what is run in the non-native execution environment, and the user will run this object file to run a container of the image, this makes sense and conforms to this MCP paradigm. Other environments may use an alternate extension, such as .exe, to indicate an executable file. The proxy compiler also sets the metadata, e.g., in the example described here, an IMAGEID attribute (which requires special privileges which the proxy compiler has), to be equal to the image identification acquired from the non-native image creator 510. This now becomes a read-only attribute for the attributed native executable.

Accordingly, in the example shown, the attributed native executable 716 may be run (at step 814), which queries the value of the IMAGEID attribute, and modifies the command it issues. In this way, the attributed native executable is only capable of running a container of the specific image for which it was built. The non-native image can them be executed in a non-native execution environment, linked by the attributed native executable 716 (step 816).

Accordingly, the embodiment of FIGS. 7-8 eliminates the customization of a source file and its subsequent compilation. This in turn reduces the time for the image to be built and be ready for execution, but retains the one-to-one-relationship between native executable and non-native image.

Referring to FIGS. 1-8 generally, it is noted that in the various embodiments discussed, the one-to-one relationship between the native executable and the non-native image merges two heterogeneous environments, and applies the paradigms of the native execution environment to the paradigms of the non-native execution environment. Because the process of running the image produced by this process is begun in the native execution environment, the native environment paradigms are active and enforced at time of invocation. The native environment runs a copy of the image in the non-native execution environment but bridges the two environments with the redirection of stdin, stdout, and stderr. This allows the native paradigms for data input and output to be seamlessly applied to the non-native paradigm. Hence to the user of the native system, the non-native program appears to be native, as the user is interacting with it with the native paradigms the user expects for the environment he is immersed in.

Still further, with most environments, multiple copies of the native executable image may be run simultaneously. Consistent with the above embodiments, each copy of the native executable image that is run will instantiate another container with the appropriate redirection. These additional native executions again are dependent upon the native security paradigm for allowing the execution. For example, in most environments, a user has the ability to specify if the security of an executable is private or public. If private, only that user, or perhaps an administrator, has sufficient privilege to execute the program. However, the user may designate that the executable is public and may be invoked by any user. The mechanism by which this is done is specific to the native execution environment, but its effects are seamlessly applied by extension into the non-native execution environment.

Additionally, and referring to the various embodiments discussed herein, it can be seen that the relationship between the native task to the non-native task is that of a proxy as well. The native task will typically have a unique identifier to identify itself to the operating environment. This is commonly called a Process ID or PID. Regardless of its name, this unique identifier refers only to that active process. However, this unique number can be used to send data and/or signals to the non-native environment or to the non-native task directly, to affect the non-native execution environment based on direction from the native execution environment.

Examples of these actions are data input from batch environments where a system operator is required to supply input to a running task. Another is an operating system query as to how many resources a task is using. Using principles of the present disclosure, the request for resource enumeration is passed down from the native execution environment to the non-native execution environment, and the results are propagated back to the native execution environment, and reported using the appropriate native paradigms.

This dynamic paradigm extension from one environment to the other is powerful and allows for faster application of industry technologies in environments which are unknown to, or have never been considered, in the industry technologies. This brings some measure of future proofing to the native environment, as long as the non-native environment supports a relatively basic function subset.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method comprising:
  invoking a proxy compiler within a native execution environment by providing non-native instructions thereto; and
  at the proxy compiler:
    determining a native executable to be used based on an identity of a non-native image creator to be used for creation of a non-native image;
    providing the non-native instructions to a non-native image creator in a non-native execution environment for creation of the non-native image; and
    based on obtaining identification information of the created non-native image, creating an instance of the native executable that is associated with the non-native image by assigning a read-only attribute to the instance of the native executable.

2. The method of claim 1, further comprising running the native executable by:
  querying the read-only attribute to determine an identity of the non-native image; and
  issuing a command to instantiate a container operable to execute the non-native image within a non-native execution environment hosted by the container.

3. The method of claim 2, further comprising executing the non-native image within the non-native environment hosted by the container, wherein executing the non-native image includes performing one or more processing operations defined by the non-native image on data stored in the native environment.

4. The method of claim 1, wherein invoking the proxy compiler includes identifying the non-native image creator to be used.

5. The method of claim 1, further comprising invoking a command in the non-native execution environment which runs the non-native image creator to which the non-native instructions are provided.

6. The method of claim 1, wherein, upon invoking the command, communication connections are established between the proxy compiler and the non-native execution environment.

7. The method of claim 1, further comprising obtaining identification information of the created non-native image by receiving an identifier of the non-native image at the proxy compiler via a connection established between the proxy compiler and the non-native execution environment.

8. The method of claim 7, wherein obtaining the identification information includes reading a file where the identification information is stored by the non-native image creator.

9. The method of claim 1, wherein the native execution environment comprises an MCP-based execution environment and the non-native execution environment comprises an Intel x64 execution environment.

10. The method of claim 1, wherein the read-only attribute comprises an image identification attribute of the native executable, and wherein a value of the read-only attribute set by the proxy compiler corresponds to the identification information of the created non-native image.

11. The method of claim 1, wherein the created non-native image and the native executable have a 1:1 correlation.

12. The method of claim 1, further comprising running a plurality of instances of the native executable concurrently, wherein each of the plurality of instances is associated with a corresponding container within which an instance of the non-native image is executed.

13. The method of claim 12, wherein each of the plurality of instances of the native executable has a different process identifier, wherein the process identifier is used by the non-native image in the corresponding container for exchange of data between the native execution environment and the non-native execution environment.

14. A computing system comprising:
a native execution environment on a host system hosting a native executable having a read-only attribute assigned thereto by a proxy compiler at a time of creation;
a containerized non-native execution environment hosting a non-native image, the non-native image being created in response to non-native instructions sent to a non-native image creator by the proxy compiler;
wherein the read-only attribute corresponds to identification information of the created non-native image, the identification information being generated by the non-native image creator and provided to the proxy compiler at the time of creation of the non-native image.

15. The computing system of claim 14, wherein the containerized non-native execution environment is instantiated on the host system with the native computing environment.

16. The computing system of claim 14, wherein the native execution environment and the non-native execution environment are communicatively connected.

17. The computing system of claim 14, wherein the native execution environment comprises an MCP-based execution environment and the non-native execution environment comprises an Intel x64 execution environment.

18. A computer-implemented method comprising:
invoking a proxy compiler within a native execution environment by providing non-native instructions thereto;
at the proxy compiler:
determining a native executable to be used based on an identity of a non-native image creator to be used for creation of a non-native image;
providing the non-native instructions to a non-native image creator in a non-native execution environment for creation of the non-native image; and
based on obtaining identification information of the created non-native image, creating an instance of the native executable that is associated with the non-native image by assigning a read-only attribute to the instance of the native executable;
within the native execution environment:
querying the read-only attribute to determine an identity of the non-native image; and
issuing a command to instantiate a container operable to execute the non-native image within a non-native execution environment; and
within the instantiated container, executing the non-native image.

19. The computer-implemented method of claim 18, wherein the native execution environment and the non-native execution environment are communicatively connected.

20. The computer-implemented method of claim 19, further comprising running a plurality of instances of the native executable concurrently within the native execution environment, wherein each of the plurality of instances is associated with a corresponding container within which an instance of the non-native image is executed, and
wherein each of the plurality of instances of the native executable has a different process identifier, the process identifier being used by the non-native image in the corresponding container for exchange of data between the native execution environment and the non-native execution environment.

21. The computer-implemented method of claim 18, wherein the read-only attribute comprises an image identification attribute of the native executable, and wherein a value of the read-only attribute set by the proxy compiler corresponds to the identification information of the created non-native image.

* * * * *